United States Patent Office 3,304,839
Patented Feb. 21, 1967

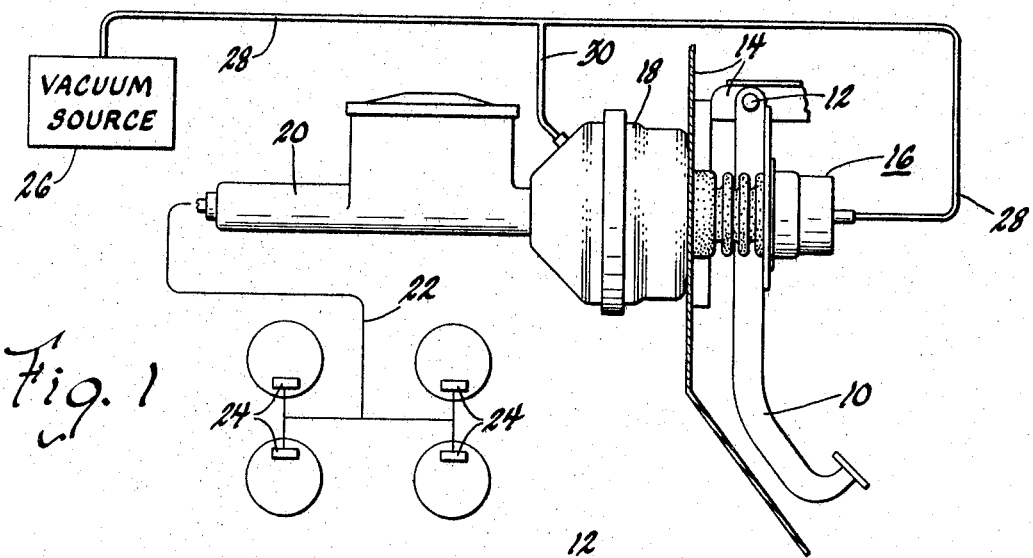
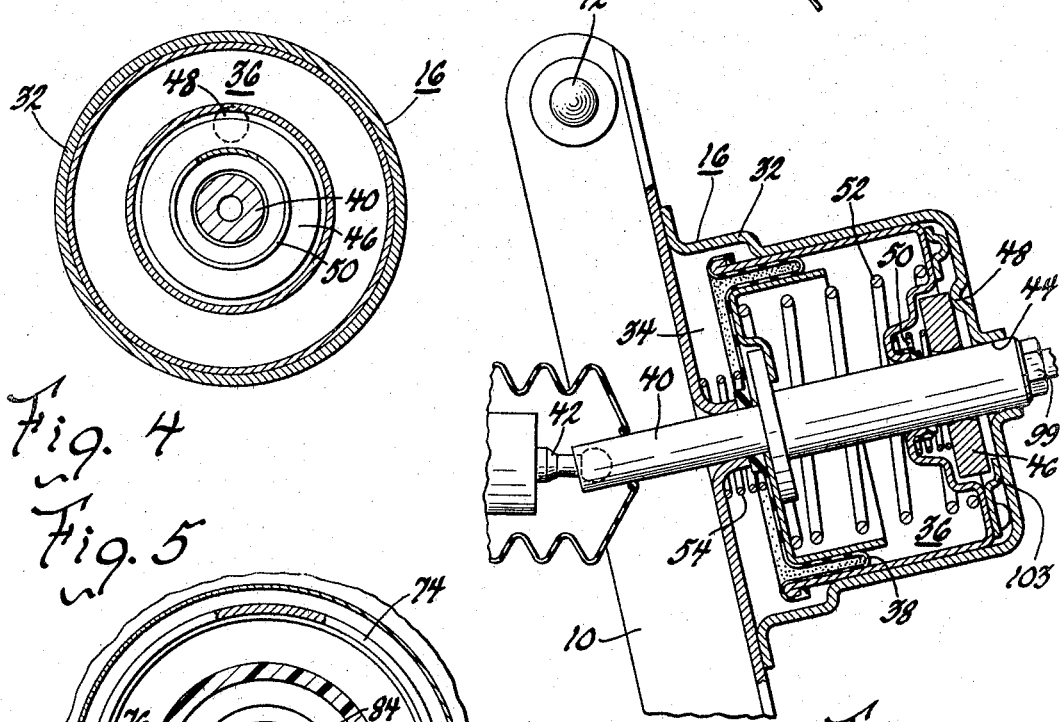
Fig. 1
Fig. 4
Fig. 5
Fig. 3
INVENTORS
Robert M. VanHouse
Edward J. DeHoff
BY
THEIR ATTORNEY

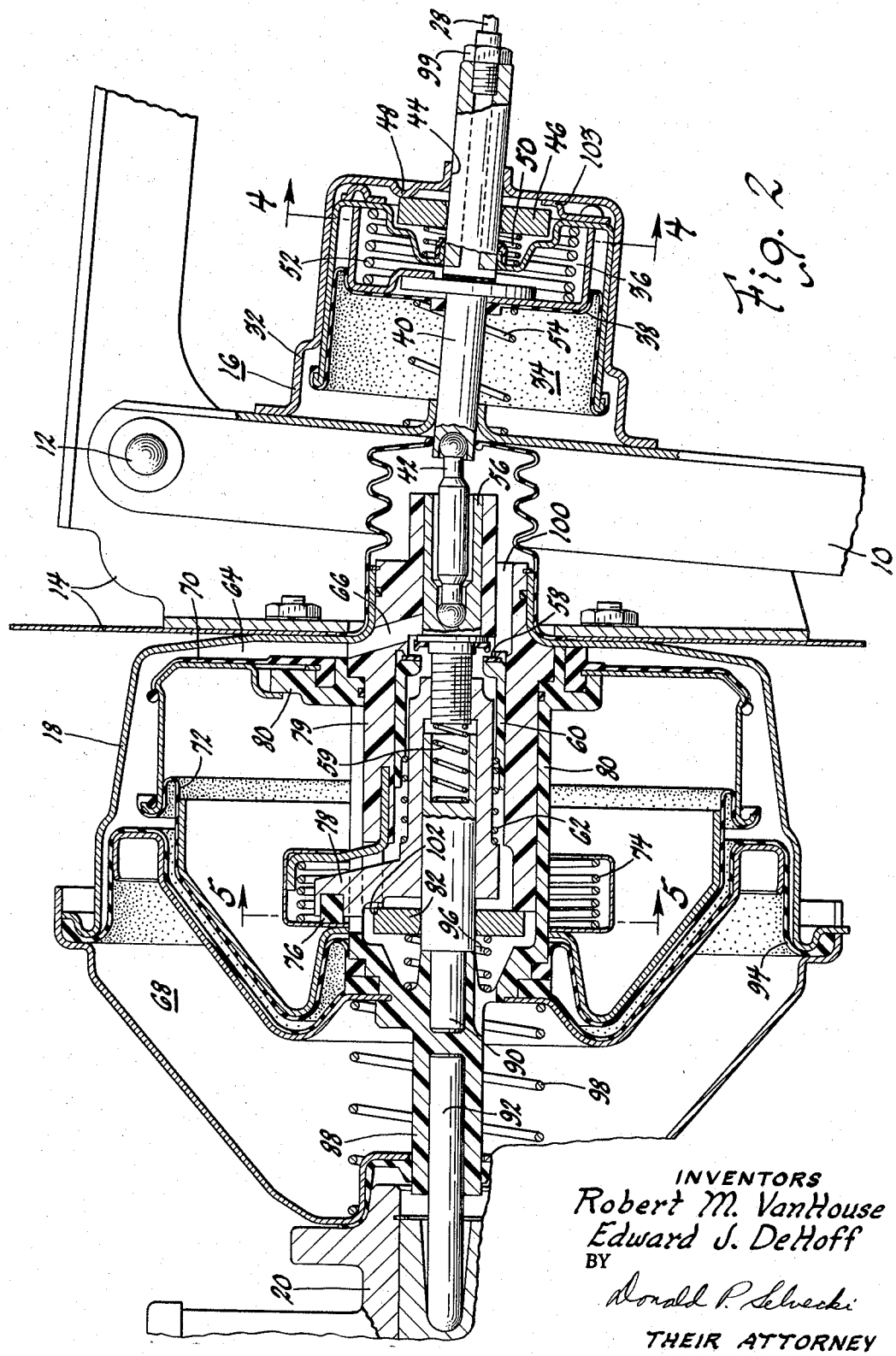

3,304,839
LOW TRAVEL VACUUM SUSPENDED BOOSTER
Robert M. Van House and Edward J. De Hoff, Dayton, Ohio, assignors to General Motors Corporation, Detroit, Mich., a corporation of Delaware
Filed Apr. 22, 1965, Ser. No. 450,040
8 Claims. (Cl. 91—372)

This invention relates to braking mechanisms and more particularly to a low travel, vacuum suspended booster designed for use with vehicle braking systems.

It is desirable in the designing of braking mechanism for motor vehicles to have a low pedal travel to avoid clutter in the driving compartment of the motor vehicle. Vacuum suspended boosters which are actuated by valving routing atmospheric air into the booster body are very often used for this purpose. However, a problem is thereby created in that a low ratio for pedal operation exists when the power system fails and mechanical operation is necessitated. It is generally necessary to provide some type of device for increasing the distance a pedal is suspended from the floor automatically when there is a power failure. Prior art contains several mechanisms for bringing about this result but generally are very bulky or very expensive to manufacture.

It is an object of the present invention to provide an improved low travel, vacuum suspended booster which automatically raises the brake pedal when power failure occurs within the booster necessitating manual operation thereof.

It is another object of the present invention to provide an improved booster with a pedal raising mechanism that uses up a minimum amount of space and is adaptable for use with vacuum boosters of common design.

It is yet another object of the present invention to provide an improved pedal raising device for use upon power failure in a vacuum suspended booster which utilizes a friction ring sensitive to push rod travel and which is available to provide a mechanical link for manual booster operation during periods of complete or partial power failure.

It is a further object of the present invention to provide an improved low travel, vacuum suspended booster incorporating a very simple arrangement for giving a certain amount of reverse thrust to an actuator during powered booster operation which provides a "feel" for the brake operator.

Further objects and advantages of the present invention will be apparent from the following description, reference being had to the accompanying drawings wherein a preferred embodiment of the present invention is clearly shown.

In the drawings:

FIGURE 1 is a diagrammatic illustration of a typical braking system made in accordance with the present invention;

FIGURE 2 is a sectional view of the subject invention, the pedal being shown in the position it assumes during powered operation of the booster;

FIGURE 3 is a sectional view of the lifter mechanism illustrating the pedal configuration during periods of unpowered operation;

FIGURE 4 is a sectional view taken along line 4—4 of FIGURE 2;

FIGURE 5 is a sectional view taken along line 5—5 of FIGURE 2.

Referring now to FIGURE 1, a brake pedal 10 is pivotally supported at point 12 which is carried by a fixed portion of the vehicle 14. Pedal 10 carries a pedal lift mechanism, generally designated by numeral 16, which is sometimes referred to herein as the second control means. Brake booster housing 18 is supported by fixed portion 14 of the vehicle and is operationally related to brake pedal 10 in a manner to be hereinafter described. Booster 18 is designed to pressurize master cylinder 20, thereby providing an increased force in hydraulic lines 22 to vehicle wheel cylinders 24, thereby providing a braking action.

Vacuum source 26 can be the intake manifold of a motor vehicle engine or a separate vacuum pump as desired. A negative pressure is communicated through line 28 to the pedal lift mechanism 16 and through line 30 into booster housing 18.

Referring now to FIGURE 2, brake pedal 10 carries a pedal lift mechanism 16 which basically comprises an outer shell 32 divided into compartment 34 and compartment 36 by diaphragm 38. Diaphragm 38 circumferentially engages a drive rod 40 which in turn pivotally engages push rod 42. Push rod 42, drive rod 40 and actuator pedal 10 are sometimes referred to herein as input means.

Drive rod 40 is slidable in aperture 44 formed through one wall of shell 32. A tiltable friction ring 46 peripherally engages drive rod 40 and is held against nipple 48 by friction ring spring 50. The friction ring 46 and spring 50 are disposed in compartment 36 and are normally under vacuum pressure. Spring 52 loads one side of diaphragm 38 and works in opposition to spring 54 disposed against one side of diaphragm and shell 32 in chamber 34. Chamber 34 is normally at atmospheric pressure.

Push rod 42 drivably engages actuating valve 56. Actuating valve 56, when moved axially by a force exerted on push rod 42, engages resilient seat 58 initially during that movement and thereby closes off the exhaust for the vacuum pressure booster. Valve return spring 59 resists this movement of the actuating valve 56. Further movement of actuating valve 56 results in axial movement of modulating valve 60 against the tension of spring 62. Movement of modulating valve 60 throttles atmospheric pressure into chamber 64 through port 66. Chamber 64 and chamber 68 are normally vacuum balanced and it is obvious that the raising of pressure in chamber 64 results in an enlargement of modulating chamber 64 and results in forward movement of diaphragm 70 and a reverse movement of diaphragm 72. As diaphragm 72 retracts toward diaphragm 70, spring 74 is overcome, resulting in diaphragm 72 bearing against snubber 76. This reaction through snubber 76 is felt against reaction piston 78 and, therefore, provides a reverse force against actuating valve 56, thereby incorporating a "feel" into the system. Reaction piston 78 is externally piloted by a fixed element 79 which supports the entire valving mechanism.

Diaphragm 70 is carried in any well-known manner by valve housing 80 in turn slidably carried by fixed element 79. Output housing 88 is integral with housing 80. Shaft 90 carries friction ring 82 and is disposed in force transmitting relationship with an output rod 92 utilized to pressurize a master cylinder 20 in any well-known manner. Housing 88 axially locates diaphragm 72 and diaphragm 94. Spring 96 bears against housing 88 and friction ring 82 to urge friction ring 82 into perpendicular relationship with respect to shaft 90. Spring 98 serves as a return spring for housing 88 upon release of pressure from pedal 10.

In operation, chambers 68 and 64 are normally under equal negative pressure from vacuum source 26. When brake actuation is desired, pedal 10 is pivoted on point 12 drawing shell 32 of the pedal lift mechanism in the direction of pivotal movement. As previously stated, chamber 36 is under vacuum from inlet 99 and, therefore, diaphragm 38 is in approximately the position shown in FIG- URE 2. Push rod 42, by virtue of the force of spring 59, resists this initial movement and, therefore, shell 32 carried by pedal 10 tends to move relative to drive rod 40. Nipple 48 of shell 32 immediately tilts friction ring 46 on drive rod 40. In this manner, further movement of shell 32 results in movement to the left of drive rod 40, as viewed in FIGURE 2.

Drive rod 40 directly engaging push rod 42 moves said push rod and engages actuating valve 56 axially, resulting in actuating valve 56 engaging seat 58. Spring 59 initially collapses and further movement of valve 56 results in a corresponding movement of modulating valve 60. This throttles atmospheric pressure from outlet 100 to the atmosphere into chamber 64. Chamber 64 becomes positively pressurized, thereby exerting a compressive force on diaphragms 70 and 72. Diaphragm 72 moves slightly rightwardly, as viewed in FIGURE 2, into engagement with snubber 76 against the force of spring 74. Snubber 76 is carried by reaction piston 78 resulting in a force being transmitted back through valves 60 and 56 to the push rod 42 and, ultimately, pedal 10. The resultant force, however, moves diaphragm 70 leftwardly, as viewed in FIGURE 2. Housing 80 is integral with output housing 88 and movement of housing 80 results in housing 88 moving also. Output rod 92 is carried by housing 88 and operatively engages master cylinder 20 and force is thereby transmitted from housing 80 to housing 88 to output rod 92. In this manner, a power boost is created for operation of master cylinder 20.

Under conditions of partial or complete vacuum loss, chamber 36 is under reduced vacuum and the force due to atmospheric pressure acting in chamber 34, combined with the force of spring 52, moves diaphragm 38 into the configuration shown in FIGURE 3. Referring to FIGURE 3, spring 52 is shown in expanded form which results in shell 32 moving relative to drive rod 40, thereby drawing brake pedal 10 in a counterclockwise manner around pivot point 12. Therefore, brake pedal 10 is raised to a higher position relative to the toe board of the motor vehicle in which it is disposed and makes available a greater mechanical advantage for unpowered operation.

Referring to FIGURE 3, any force exerted on brake pedal 10 from its elevated position will cause nipple 48 to bear against tiltable friction ring 46 locking it on drive rod 40. Further movement of brake pedal 10 is then directly transmitted through drive rod 40 to push rod 42 into actuating valve 56. Actuating valve 56 is secured to reaction piston 78 and, therefore, piston 78 also moves with actuating valve 56. Projection 102 on reaction piston 78 unbalances the load on friction ring 82 causing it to misalign slightly and lock on shaft 90. As this series of actions takes place, there is direct force transmission from brake pedal 10 to output rod 92 giving the associated braking mechanism an actuating capability in a mechanical fashion.

When pressure is released from brake pedal 10, spring 98 seats housing 88 and spring 74 seats reaction piston 78 allowing spring 96 to exert a balanced load on friction ring 82. Shaft 90 is released, thereby allowing spring 62 and spring 59 to return modulating valve 60 and actuating valve 56, respectively, to a poised position. Lock release 103 is carried into engagement with the misaligned friction ring 46 to free friction ring 46 so that the only force acting on ring 46 is from spring 50. Friction ring 46 therefore returns to a poised position wherein it is perpendicular with respect to drive rod 40, completing the cycle.

Referring to FIGURE 3, it should be noted that, when vacuum pressure is restored to chamber 36, atmospheric pressure in chamber 34, coupled with spring 54, overcomes the force of spring 52 repositioning pedal 10 in a clockwise manner around pivot point 12, thereby poising pedal 10 for powered operation of the booster. The novel features of the subject invention include a friction lock ring which is sensitive to push rod travel and, therefore, available to provide mechanical brake actuation either at run-out of the booster system or at any stage apart from a complete vacuum failure. This device provides for low unlocking loads in an infinite number of locking positions. Also, the reaction arrangement allows the positive application of pedal force to a low travel, servo type booster. The particular arrangement of parts shown herein permits the load supported by the foot during the brake application to be transferred to the power piston by means of a novel diaphragm arrangement. In addition, a pedal lifter utilizing the same friction lock ring previously described permits the use of a relatively light pedal lifting spring and yet maintains safe operation of the brake during the pedal raising operation. The diaphragm used to collapse the pedal raising spring is also used for the purpose of releasing the friction lock device.

While the embodiment of the present invention, as herein disclosed, constitutes a preferred form, it is to be understood that other forms might be adopted.

What is claimed is as follows:

1. A brake booster for hydraulically operated vehicle brakes, said brake booster comprising: a vacuum pressure source; a booster housing in pressure communication with said vacuum pressure source input means including a driving portion slidably carried in one portion of said booster housing and adapted to have an input force external therein; output means from said booster housing to a master cylinder; first control means slidably disposed in said booster housing for selectively routing pressure from said vacuum pressure source to portions of said housing whereby an input force is intensified and made available to said output means; and second control means carried by said input means and being movable therewith, said second control means including vacuum responsive means cooperating with friction means to variably grip said driving portion of said input means in response to pressure in said booster housing thereby adapting said input means to exert a varying force on said first control means in proportion to pressure changes in said booster housing.

2. A brake booster according to claim 1 wherein the first control means includes a first slide telescopingly cooperating with a second slide to selectively meter atmospheric pressure into a normally negatively pressurized area in said booster housing to impress the force of atmospheric pressure against one side of vacuum pressure balanced portions to engender a force increase for said output means over that force originally made available by the input force.

3. A brake booster according to claim 1 wherein the second control means includes a chamber having a diaphragm separator therein, a first side of said diaphragm acted on by first spring means, and a second side acted on by second spring means and a negative pressure, said second side normally overbalancing said first side thereby maintaining a predetermined spatial relationship between said diaphragm separator and the driving portion of the input means, said diaphragm separator being movable relative to the driving portion of the input means in response to changes in negative pressure in said booster housing thereby creating an adjusted ratio for the force made available for exertion on said input means.

4. A brake booster according to claim 3 wherein said second control means includes a tiltable friction member circumferentially mounted on the driving portion of said input means, said tiltable friction member being lockingly engageable with the driving portion during conditions when a force is exerted on said input means thereby maintaining a spatial relationship between said diaphragm separator and the driving means as variably established in response to changes in negative pressure in said booster housing.

5. A brake booster for increasing an input force made available for operation of vehicle brakes, said brake booster comprising: a vacuum source; a booster housing having vacuum balanced areas therein in pressure communication with said vacuum source; input means including a pivotable actuator lever and a driving portion associated therewith, said input means having a portion slidably disposed in one wall of said booster housing; output means including reverse pressure creating means slidably disposed in another wall of said booster housing and disposed in force transmitting relationship with the vehicle brakes; first control means slidably disposed in said booster housing and responsive to an input force from said input means to selectively unbalance the normally vacuum balanced areas in said booster housing thereby multiplying the input force from said input means to said output means; and second control means including a tiltable locking lever and pressure responsive means carried by the pivotable actuator lever of said input means for altering the pivotal position of said actuator lever and thereby varying the mechanical advantage of the actuator lever in response to pressure changes in certain areas of said booster housing thereby effectively multiplying the input force impressed on said input means.

6. A brake booster according to claim 5 wherein the reverse pressure creating means includes a spring loaded piston reacting against said first control means to provide a resistance to slidable movement of said first control means thereby preventing over application by said input means.

7. A brake booster for operation of vehicle brakes comprising: a vacuum source; a booster housing having vacuum balanced areas therein in pressure communication with said vacuum source; input means including a pivotable actuator lever and a driving portion associated therewith, said input means having a portion slidably disposed in one wall of said booster housing; output means including reverse pressure creating means slidably disposed in another wall of said booster housing and disposed in force transmitting relationship with the vehicle brakes; first control means slidably disposed in said booster housing and responsive to an input force from said input means to selectively unbalance the normally vacuum balanced areas in said booster housing thereby multiplying the input force from said input means to said output means; linking drive means including friction means for coupling said first control means to said output means during conditions of operation wherein negative pressure availability from said vacuum source diminishes below predetermined levels, said friction means operable to establish a direct force transmission for said input means during normal braking operations; and second control means carried by the pivotable actuator lever of said input means for altering the pivotal position of said actuator lever and thereby varying the mechanical advantage of said actuator lever in response to pressure changes in certain areas of said booster housing thereby effectively multiplying the input force impressed on said input means.

8. A brake booster according to claim 7 wherein said linking drive means includes a spring loaded tiltable friction ring encompassing a portion of said output means whereby extreme actuating movement of said first control means tilts said tiltable friction ring into gripping relationship with said output means resulting in a direct force transmitted arrangement between said first control means and said output means.

References Cited by the Examiner

UNITED STATES PATENTS

| | | | |
|---|---|---|---|
| 2,844,228 | 7/1958 | Schnell | 91—391 |
| 2,848,980 | 8/1958 | Ayers | 91—391 |
| 2,910,147 | 10/1959 | Fishtahler et al. | 91—391 |
| 3,152,518 | 10/1964 | Ayers | 91—434 |
| 3,155,012 | 11/1964 | Ayers | 91—434 |
| 3,179,017 | 4/1965 | Burker | 91—391 |

MARTIN P. SCHWADRON, *Primary Examiner.*

PAUL E. MASLOUSKY, *Examiner.*